(12) United States Patent
Wuidart

(10) Patent No.: US 7,594,101 B2
(45) Date of Patent: Sep. 22, 2009

(54) SECURE DIGITAL PROCESSING UNIT AND METHOD FOR PROTECTING PROGRAMS

(75) Inventor: Sylvie Wuidart, Pourrieres (FR)

(73) Assignee: STMicroelectronics S.A., Montrouge (FR)

( * ) Notice: Subject to any disclaimer, the term of this patent is extended or adjusted under 35 U.S.C. 154(b) by 253 days.

(21) Appl. No.: 11/701,954

(22) Filed: Feb. 2, 2007

(65) Prior Publication Data
US 2008/0046693 A1 Feb. 21, 2008

(30) Foreign Application Priority Data
Feb. 6, 2006 (FR) .................................. 06 50409

(51) Int. Cl.
*G06F 12/14* (2006.01)
(52) U.S. Cl. ..................................... 712/225
(58) Field of Classification Search ............... 712/225
See application file for complete search history.

(56) References Cited

U.S. PATENT DOCUMENTS

| | | | | |
|---|---|---|---|---|
| 4,465,901 | A * | 8/1984 | Best ............................ | 713/190 |
| 4,633,388 | A * | 12/1986 | Chiu ........................... | 712/208 |
| 5,883,954 | A * | 3/1999 | Ronning ...................... | 705/52 |
| 5,943,421 | A | 8/1999 | Grabon | |
| 6,598,166 | B1 * | 7/2003 | Folmsbee ................... | 713/190 |
| 6,675,298 | B1 * | 1/2004 | Folmsbee ................... | 713/190 |
| 6,986,052 | B1 | 1/2006 | Mittal | |
| 7,065,215 | B2 * | 6/2006 | Shirakawa et al. .......... | 380/277 |
| 2003/0061499 | A1 | 3/2003 | Durrant | |
| 2004/0136530 | A1 * | 7/2004 | Endo et al. .................... | 380/44 |
| 2006/0015748 | A1 * | 1/2006 | Goto et al. .................. | 713/190 |
| 2006/0015749 | A1 | 1/2006 | Mittal | |

FOREIGN PATENT DOCUMENTS

EP 1 544 704 A1 6/2005

OTHER PUBLICATIONS

French Search Report from French Patent Application 06/50409, filed Feb. 6, 2006.

* cited by examiner

*Primary Examiner*—Eric Coleman
(74) *Attorney, Agent, or Firm*—Lisa K. Jorgenson; William R. McClellan; Wolf, Greenfield & Sacks, P.C

(57) ABSTRACT

A digital processing unit for executing program instructions stored in at least two memories and including at least one first register of temporary storage of the operator of a current instruction to be executed and at least a second register of temporary storage of at least one argument or operand of said current instruction, and a protection circuit for submitting, upstream of the register, the operator to a deciphering function if this operator originates from one of the memories or from an area of these memories, identified from the address provided by a program counter. The present invention also relates to a method for protecting a program for updating an electronic circuit and controlling its execution, including at least one step of ciphering or deciphering of program instruction operators.

20 Claims, 2 Drawing Sheets

SECURE DIGITAL PROCESSING UNIT AND METHOD FOR PROTECTING PROGRAMS

BACKGROUND OF THE INVENTION

1. Field of the Invention

The present invention generally relates to digital data processing units and, more specifically, to central processing units (CPU) which interpret program instructions contained in one or several memories external to the processing unit.

The present invention more specifically applies to processing units intended to execute programs updated by instructions stored (for example, downloaded) in a memory different from that containing the original programs.

2. Discussion of the Related Art

In a processing unit, the original program(s) are stored in a ROM on manufacturing of the circuit containing the unit. Such programs are likely to be corrected or completed along the product lifetime by correction codes (patches) loaded into a programmable non-volatile memory or a RAM (for single-use patches). Such updating programs should be able to take over the circuit control, in particular if said patches are intended for the program hosted in ROM, which is not reprogrammable.

A disadvantage then is that a malicious patch may be able to take over the circuit control, for example, to hack secret quantities or to deactivate the access control mechanisms.

To protect circuit against the execution of unauthorized programs, mechanisms checking the integrity of the executed program code (for example, by a signature calculation) are generally provided to make sure that the programs being executed actually correspond to authorized programs.

However, it is difficult for such mechanisms to be efficient for updatings with a signature that cannot be known in advance. For the original program, it is possible to calculate the signature on manufacturing and store it in ROM. However, for updatings, the signature is also stored in a reprogrammable memory since it cannot be known from as soon as the manufacturing. A malicious patch can thus be stored with a signature considered as acceptable by the circuit.

Another technique disclosed in US-A-2003/0031499 consists in ciphering a program after or during its loading in the circuit using a key known of the circuit and a symmetrical algorithm. Ciphered instructions are stored in memory areas the call of which activates (from the address) a deciphering when the instructions are executed. However, a hacker who would achieve the loading of a program in the circuit would get round this protection as the ciphering is made by the circuit itself.

SUMMARY OF THE INVENTION

The present invention aims at overcoming all or part of the disadvantages of processing units executing programs capable of being updated after manufacturing.

An object more specifically aims at preventing the execution of an unauthorized program downloaded in the circuit.

Another object aims at a solution compatible with the storing of programs into memories external to the processing unit.

Another object aims at a solution complementary to conventional signature calculation integrity check mechanisms.

To achieve all or part of these objects, as well as others, it is provided a digital processing unit for executing program instructions stored in at least two memories and comprising at least a first register of temporary storage of the operator of a current instruction to be executed and at least a second register of temporary storage of at least one argument or operand of said current instruction, and a protection circuit for submitting, upstream of said first register, said operator to a deciphering function if this operator originates from one of the memories or from an area of these memories, identified from the address provided by a program counter, said argument or operand being not submitted to said deciphering function.

According to an embodiment, a signal provided by the processing unit identifies, in said current instruction, its operator.

According to an embodiment, said deciphering function is implemented in the form of a reprogrammable logic.

According to an embodiment, said ciphering function is applied to instructions originating from a reprogrammable memory and is not applied to instructions stored in a non-reprogrammable memory.

According to an embodiment, the protection circuit comprises a selector having a first input receiving the result of said deciphering function while a second input directly receives said non-deciphered operator, and having an output connected to the loading input of said first register.

It is also provided an electronic circuit comprising:
a processing unit;
at least two memories; and
a memory decoder for selecting, from an address provided by the program counter, the memory in charge of providing the next instruction to be executed by the processing unit, said decoder providing the protection circuit with a signal of activation of the deciphering function.

It is also provided a method for protecting a program for updating an electronic circuit, comprising at least one step of ciphering of operators of instructions of the program before their loading in the circuit for storage in a reprogrammable memory of the circuit, the latter comprising a deciphering function selective of operators of the instructions according to whether or not the memory from which the instructions to be executed originate is reprogrammable.

The present invention also provides a method for controlling the execution, by a processing unit, of programs stored in memories, in which only the operators of the program instructions are submitted, selectively according to the memory from which the instructions originate, to a deciphering function.

The present invention also provides a smart card containing an electronic circuit provided with a processing unit.

The present invention also provides a decoder of broadcast signals containing an electronic circuit provided with a processing unit.

The foregoing and other objects, features, and advantages of the present invention will be discussed in detail in the following non-limiting description of specific embodiments in connection with the accompanying drawings.

DETAILED DESCRIPTION

Figure 1:
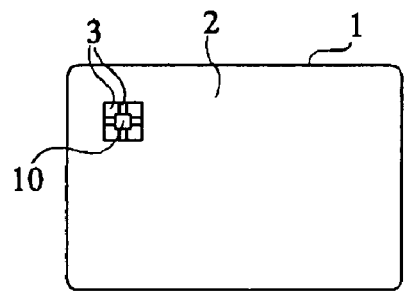
FIG. 1, shows a smart card of the type to which the present invention applies as an example.

The same elements have been designated with the same reference numerals in the different drawings. For clarity, only those elements which are useful to the understanding of the present invention have been shown and will be described hereafter. In particular, the interpretation of the instructions of a program by the processing unit of the present invention has not been described in detail, the present invention being compatible with the conventional interpretations and exploitations of the instructions of a program. Further, the mechanisms of program instruction storage have not been described in detail, the present invention being here again compatible with conventional techniques.

FIG. 1 very schematically shows a smart card 1 of the type to which the present invention applies as an example. Such a card is for example formed of a plastic support 2 on or in which is placed an integrated circuit chip 10 capable of communicating with the outside by means of contacts 3 or by means of contactless transmit/receive elements (not shown).

Figure 2:
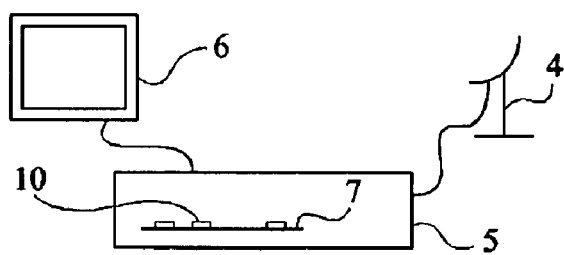
FIG. 2, very schematically shows a receiver of broadcast signals of the type to which the present invention applies as an example.

FIG. 2 shows a second example of application of the present invention to controlled-access broadcasting systems. In this example, an antenna 4 receives signals originating from a satellite (not shown), and transmits them to a decoder 5 for display on a television set 6. Decoder 5 comprises one or several electronic boards 7 provided with one or several circuits 10 for processing received digital data. This processing comprises a decoding by means of one or several secret quantities (cryptographic keys) owned by decoder 5. Such keys are contained in memories associated with electronic circuit 10 or on an external element, for example a smart card introduced into decoder 5.

Figure 3:
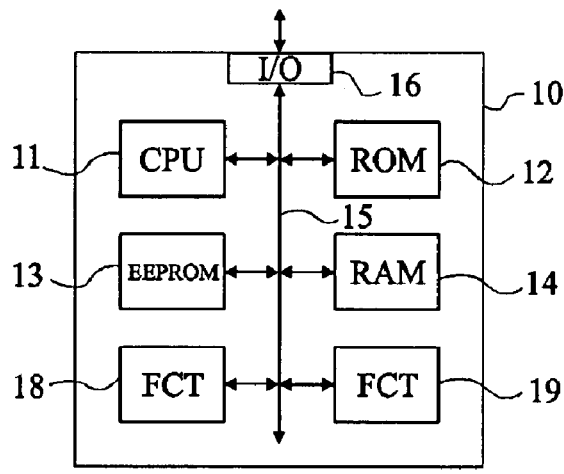
FIG. 3, schematically shows in the form of blocks an example of the architecture of an electronic circuit comprising a digital processing unit.

FIG. 3 very schematically shows in the form of blocks an example of an electronic circuit 10 of the type to which the present invention applies. This circuit comprises a central processing unit 11 (CPU) capable of executing programs contained in one or several memories. In this example, circuit 10 comprises a non-reprogrammable non-volatile memory 12 (ROM), a reprogrammable non-volatile memory 13 (EEPROM), and a RAM 14. One or several data, control, and address buses 15 are used as a support for the communication between the different components of circuit 10 and with an input/output (I/O) interface 16 for communication with or without contact with the outside. Most often, circuit 10 comprises other functions (blocks 18 and 19, FCT) depending on the application. These are, for example dedicated cryptographic calculation cells for implementing ciphering algorithms.

The original program(s) are stored in ROM 12 on manufacturing of circuit 10. Correction codes (patches) may be loaded into programmable non-volatile memory 13 or RAM 14.

Figure 4:
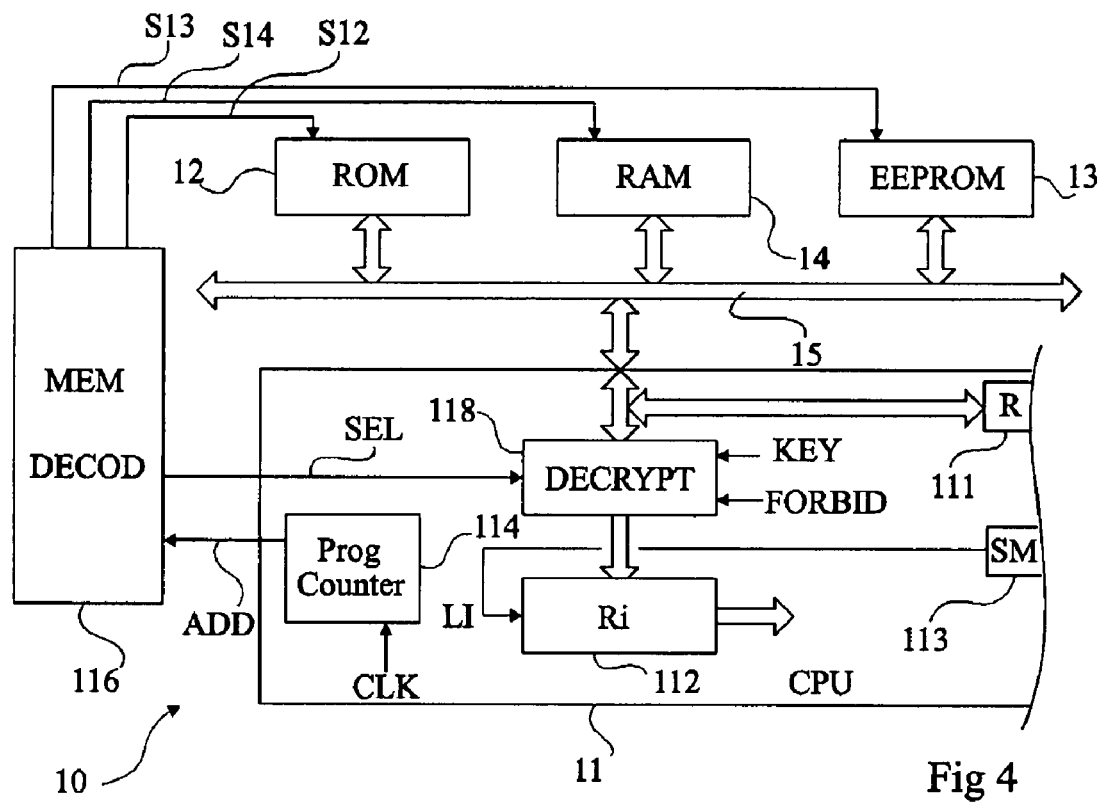
FIG. 4 schematically and partially shows in the form of blocks an embodiment of a processing unit.

FIG. 4 very schematically shows in the form of blocks a partial embodiment of a central processing unit 11 (CPU).

Unit 11 communicates via one or several data, control, and address buses 15 with different memories of an electronic circuit 10 (for example, of a smart card integrated circuit). Some memories may be external to circuit 10. In the example of FIG. 4, the existence of a non-volatile memory 12 programmed on manufacturing (ROM), of a non-volatile reprogrammable memory 13 (EEPROM), and of a RAM 14 is assumed. Other functions, not shown, of circuit 10 are capable of communicating with unit 11 and the memories over buses 15. For simplification, the elements of communication with or without contact with the outside of circuit 10 have not been shown.

As in any program processing unit, an instruction is, for its execution, transferred into registers contained by unit 11. Each instruction comprises an operator and most often one or several operands or arguments (for example, addresses, variables, etc.). An instruction register 112 (Ri) is intended to receive the operators of the instructions and one or several registers 111 (R) are intended to receive the arguments (addresses) or operands (variables) associated to operators. Operating codes (opcodes) forming the arguments or operands may come from a memory different from that containing operating code representing the operator. The loading of the instructions from any of memories 12, 13, or 14 is performed under control of a program counter 114 (Prog Counter) which provides an address ADD to a memory decoder 116 (MEM DECOD) in charge of selecting that of the memories which contains the instruction requested by the processing unit. Decoder 116 is either integrated to processing unit 11, or an element distinct from unit 11. It provides signals S12, S13, and S14 to respective memories 12, 13, and 14. Such signals are, for example, individual signals intended for the different memories to select the memory in charge of providing the instruction over bus 15. According to another example, not shown, all memories receive the same signal, the content of which differs according to the addressed memory, the memories comprising means for interpreting this signal.

The different elements of processing unit 11 are synchronized by a clock signal CLK (for simplification, only illustrated as being provided to program counter 114). Instruction register 112 receives an instruction loading signal LI (LOAD INSTRUCTION) provided by a sequencer or state machine 113 (SM) of the central processing unit when an instruction is ready on bus 15 to be loaded into the processing unit. Operating codes of the instruction are divided in unit 11 between instruction register 112 for the operator and registers 111 for the arguments or operands. Signal LI is only provided for the operators of the instruction and not for their arguments or operands.

According to an embodiment, the operator of an instruction coming from bus 15 is loaded into instruction register 112, either directly, or after deciphering, according to the memory (or of a memory area) in which this instruction is present. In FIG. 4, this functionality has been illustrated by a circuit 118 (DECRYPT) of central processing unit 11, interposed between bus 15 and instruction register 112. Circuit 118 receives a signal SEL from memory decoder 116 indicative of the need or not to decipher the instruction present on bus 15 before transmission to register 112. This selection signal is easily extracted from the memory decoder based on the address signal provided by program counter 114 since the function of this decoder is, based on address ADD, to determine the concerned memory 12, 13, or 14. Cell 118 contains or receives a key KEY for deciphering or decoding the ciphered operators. Deciphering function only concerns the operators, not the arguments or operands.

For any instruction coming from non-reprogrammable memory 12, the operator is not deciphered and can be directly interpreted by unit 11. However, for the instructions (preferably for any instruction) coming from a reprogrammable memory 13 or 14, the operator should be decoded (deciphered) for a proper execution of the instruction. This means that an updating program which has not been correctly coded (ciphered) on writing or design thereof will not be correctly interpreted by unit 11.

On compiling of an updating program to be loaded towards electronic circuits (for example, to be downloaded), a ciphering processing is performed. As only the operators are ciphered, a possible detection by a malicious user is more difficult. Further, the ciphering may be executed for any instruction (its operator) independently from the fact that the operands or arguments that it processes are or not variables.

As the only ciphered data are the operators that are loaded in the instruction register, the execution of the code itself determines if the data read in the memory are to be deciphered.

The downloading into the electronic circuit, and thus the storage in non-volatile or volatile reprogrammable memory 13 or 14, is performed with operators ciphered by key KEY. This key is, for example, stored on manufacturing, and thus in memory 12, and is thus known by all the electronic circuits capable of receiving updating programs. As a variation, the key is stored and/or modified afterwards, provided for the key to be known on compiling of the program outside the circuit.

Figure 5:
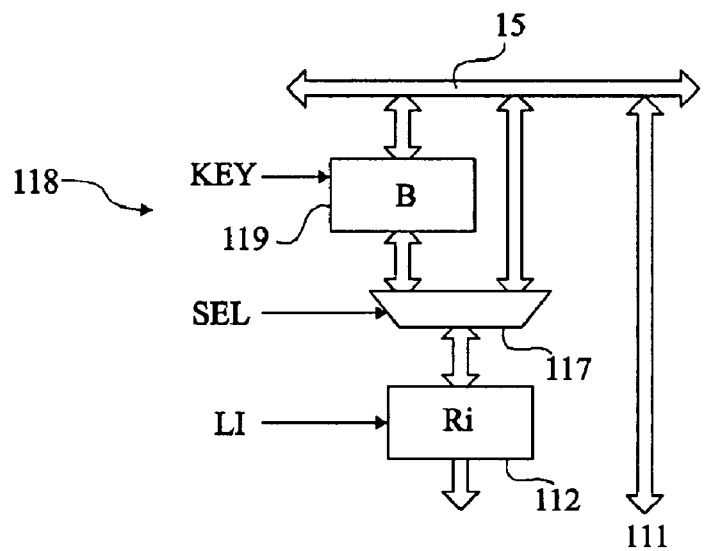
FIG. 5 shows a detail of the unit of FIG. 4.

FIG. 5 very schematically shows an example of a circuit 118 according to an embodiment of the present invention. Signal SEL is used to select one or two inputs of a multiplexer or selector 117 from among a first input coming from a circuit 119, executing a deciphering function (B) by means of key KEY, and a second input directly coming from bus 15. The output of multiplexer 117 is connected to the load input of register 112.

In the embodiment illustrated in FIG. 5, all the operators coming from bus 15 are deciphered by circuit 119, but the result of this deciphering is or not taken into account according to the memory from which the instruction comes. As a variation, only the instructions to be deciphered transit through function 119.

As soon as an instruction comes from one of memories 13 or 14, decoder 116 activates signal SEL to select the first input of multiplexer 117 and enable storing of the deciphered operator in register 112 for execution. Thus, only those processing units owning key KEY will be able to correctly execute an updating.

In the example of a malicious user downloading a pirate program into one of the memories to take control of the circuit, the deciphering performed by block 119 on execution of this malicious program will make it unworkable since the ciphering algorithm will result in instructions non-interpretable by the processing unit.

The preprocessing performed on the instruction according to the memory from which it originates thus enables securing programs downloaded after the circuit manufacturing.

Deciphering function B (block 116) is, for example, performed in wired logic. Any symmetrical or asymmetrical algorithm may be used for the implementation of the present invention.

As a variation, deciphering function 119 is made in the form of a reprogrammable logic (FPGA) to be able to modify it if updating programs are pirated. This enables, in particular, making such hacked programs invalid from as soon as function B is loaded.

According to the embodiment illustrated in FIG. 4, element 118 also receives a blocking signal FORBID (optional), provided by the processing unit to forbid the execution of updates. For example, signal FORBID is a flag stored in a register of block 118 to block the loading of an instruction into register 112 if the selection signal detects the loading of an instruction from the RAM. As a variation, signal FORBID modifies a parameter of the ciphering function, which is then no longer able to correctly decode the lines of the updating programs.

Figure 6:
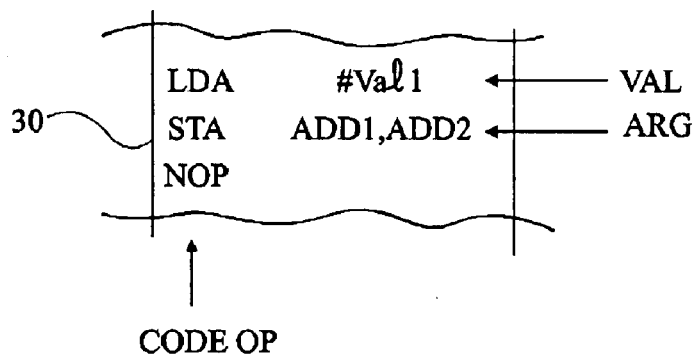
FIG. 6 shows an example of instructions of a program likely to be processed by a processing unit.

FIG. 6 shows a partial example of an executable code comprising three instruction lines, each provided with an operator CODEOP and, for the first two lines, with an operand VAL and an argument ARG respectively. The selected examples of instructions are arbitrary. The first line is an instruction LDA for loading a value Val1. The second line is an instruction STA for storing this value at addresses ADD1 and ADD2 of a memory and the third line is a waiting instruction NOP (no operation). It is assumed that the first line is contained in memory 13 while the next two lines are in ROM 12. This is a simplified example. In practice, the distribution of the instructions between the different memories will be performed by program or sub-program rather than by line of a same program.

Figure 7A:
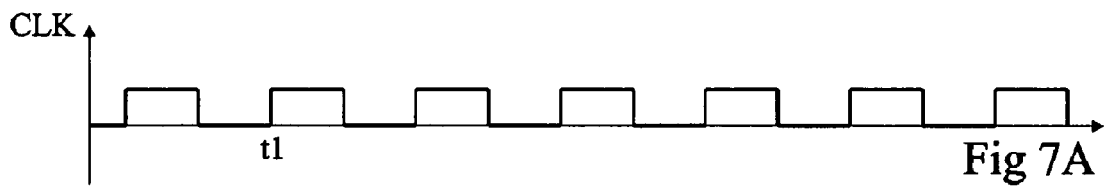
FIGS. 7A, 7B, 7C, 7D, and 7E are timing diagrams illustrating the operation of the unit of FIG. 4 to execute the instructions of FIG. 6.
Figure 7B:
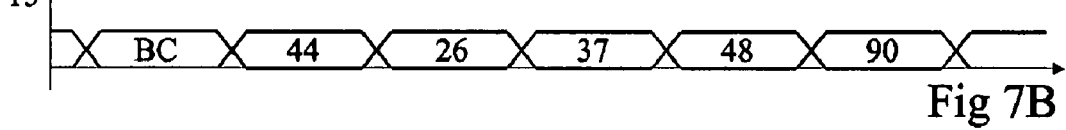
Figure 7C:
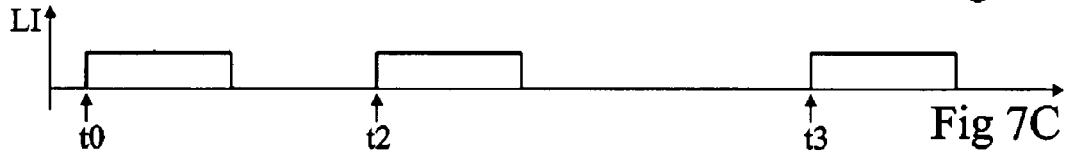
Figure 7D:
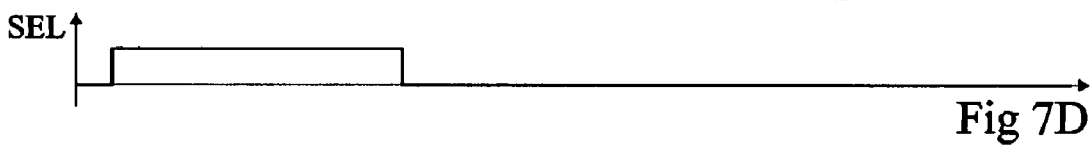
Figure 7E:
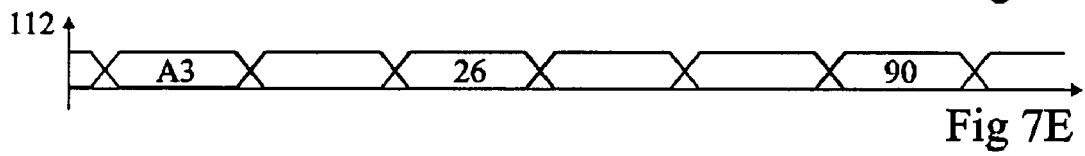

FIGS. 7A, 7B, 7C, 7D, and 7E illustrate, in timing diagrams, the execution of the three lines of program 30 of FIG. 6. FIG. 7A shows clock signal CLK. FIG. 7B shows the signals transiting over bus 15. FIG. 7C shows signal LI for loading instructions into register 112, triggered by program counter 114. FIG. 7D shows signal SEL. For simplification, the time shiftings due to the propagation times have been neglected.

The first instruction starts at a time t0 with a state switching (for example, to the high state) of signal LI. This switching of signal LI indicates to block 118 that the code representing operator LDA (for example, hexadecimal code BC) present on bus 15 must be loaded into instruction register 112. For an operator coming from memory 13, the loading is only performed after deciphering by element 119. It is assumed that deciphered code BC provides code A3. Code A3 is provided to register 112 and is interpretable by unit 11 as corresponding to operator LDA. In the absence of a correct deciphering, the code obtained from code BC is that of another operator (or of no operator) and thus does not result in the expected execution.

At the next clock cycle (time t1), operand Val1 (for example 44 in hexadecimal notation) is present on the bus and is exploited by the central processing unit. It being an operand (identified by the fact that signal LI is back to the quiescent state), the value does not transit through instruction register 112 but is stored in one of registers 111. Further, this operand is preferably not ciphered. Once the first instruction line is over, signal LI switches back to the high state at a time t2, indicating the need to load the next instruction.

Since the operator of this instruction comes from the ROM, considered as secure, signal SEL remains inactive and the code of the operator is not modified for its loading into register 112 with respect to the value read from the bus. This code directly corresponds to that of operator STA. As for the first instruction, the arguments (here, 37 and 48) present in the next two clock cycles transit without transiting through instruction register 112.

The third instruction (code 90) is also directly executed from a time t3.

An advantage is to enable securing the updating programs downloaded into electronic circuits after manufacturing.

Another advantage is to be compatible with conventional mechanisms of detection of trap or program disturbance attempts. Indeed, a signature calculation remains possible to check the signature of the recorded programs.

Of course, the present invention is likely to have various alterations, improvements, and modifications which will readily occur to those skilled in the art. In particular, the practical implementation of the present invention (especially, the signal synchronization) and its adaptation to a given architecture of a processing unit is within the abilities of those skilled in the art based on the functional indications given hereabove. Further, a processing unit may comprise several different ciphering mechanisms respectively assigned to areas or memories to be monitored. Finally, although the present invention has been described in relation with an example differentiating the memories according to their reprogrammable or not character, the memories may be distributed according to other criteria, for example, according to whether such memories (including reprogrammable memories) are internal or external to a circuit or to an area of a circuit considered as secure, that is, where any modification of the content can be considered as valid.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A digital processing unit for executing program instructions, each of said program instructions including an operator and an argument or operand, stored in at least two memories and comprising at least one first register of temporary storage of the operator of a current instruction of said program instructions to be executed and at least one second register of temporary storage of the argument or operand of said current instruction, comprising a protection circuit for submitting, upstream of said first register, said operator to a deciphering function if this operator originates from one of the memories or from an area of these memories, identified from the address provided by a program counter, said argument or operand being not submitted to said deciphering function.

2. The processor unit of claim 1, wherein a signal provided by the processing unit identifies, in said current instruction, its operator.

3. The processing unit of claim 1, wherein said deciphering function is implemented in the form of a reprogrammable logic.

4. The processing unit of claim 1, wherein a ciphering function is applied to instructions originating from a reprogrammable memory and is not applied to instructions stored in a non-reprogrammable memory.

5. The processing unit of claim 1, wherein the protection circuit comprises a selector having a first input receiving the result of said deciphering function while a second input directly receives a non-deciphered operator, and having an output connected to the loading input of said first register.

6. An electronic circuit comprising:
the processing unit of claim 1;
at least two memories; and
a memory decoder for selecting, from an address provided by the program counter, the memory in charge of providing the next instruction to be executed by the processing unit, said decoder providing the protection circuit with a signal of activation of the deciphering function.

7. A method for protecting a program for updating an electronic circuit, the program including program instructions, each of said program instructions including an operator and an argument or operand, comprising at least one step of ciphering of only the operators of the instructions of the program before their loading in the circuit for storage in a reprogrammable memory of the circuit, the circuit comprising a deciphering function of the operators of the instructions selective according to whether or not the memory from which the instructions to be executed originate is reprogrammable.

8. A method for controlling the execution, by a processing unit, of programs stored in memories, the programs each including program instructions, each of said program instructions including an operator and an argument or operand, wherein only the operators of the program instructions are submitted, selectively according to the memory from which the instructions originate, to a deciphering function.

9. A smart card containing an electronic circuit provided with the processing unit of claim 1.

10. A decoder of broadcast signals containing an electronic circuit provided with the processing unit of claim 1.

11. processing unit for executing program instructions, each of the program instructions including an operator and an argument or operand, comprising:
a first register to store the operator of a current instruction of the program instructions;
a second register to store the argument or operand of the current instruction; and
a protection circuit to decrypt the operator of the current instruction before loading into the first register, the argument or operand of the current instruction being loaded into the second register without decryption.

12. A digital processing unit as defined in claim 11, wherein the protection circuit is configured to decrypt the operator of the current instruction when the current instruction is stored in a first memory address range and wherein the operator of the current instruction is loaded in the first register without decryption when the current instruction is stored in a second memory address range.

13. A digital processing unit as defined in claim 12, wherein the first memory address range corresponds to a reprogrammable memory and the second memory address range corresponds to a non-reprogrammable memory.

14. A digital processing unit as defined in claim 12, wherein the protection circuit comprises a selector having a first input receiving the decrypted operator of the current instruction, a second input receiving the operator of the current instruction without decryption and a control input based on the memory address range where the current instruction is stored.

15. A digital processing unit as defined in claim 11, further comprising first and second memories and a memory decoder for selecting, from an address provided by a program counter, one of the first and second memories to provide the next instruction to be executed and for providing the protection circuit with a signal, based on the address, for enabling decryption of the operator.

16. A method for updating a program of an electronic circuit, the program including program instructions, each of the program instructions including an operator and an argument or operand, comprising:
ciphering the operators of the instructions;
loading the ciphered operators into a reprogrammable memory of the electronic circuit; and
loading the arguments and operands of the instructions into the reprogrammable memory without ciphering.

17. A method for controlling execution of program instructions by a processing unit, each of the program instructions including an operator and an argument or operand, comprising:
decrypting the operator of a current instruction;
loading the decrypted operator of the current instruction into a first register; and
loading the argument or operand of the current instruction into a second register without decryption.

18. A method for controlling execution of program instructions as defined in claim 17, wherein decrypting comprises decrypting the operator of a current instruction when the current instruction is stored in a first memory address range, further comprising loading the operator of the current instruction into the first register without decryption when the current instruction is stored in a second memory address range.

19. A method for controlling execution of program instructions as defined in claim 17, wherein decrypting comprises decrypting the operator of a current instruction stored in a reprogrammable memory and not decrypting the operator of the current instruction stored in a non-reprogrammable memory.

20. A method for controlling execution of program instructions as defined in claim 17, further comprising selecting the decrypted operator of the current instruction for loading into the first register in response to a first state of a selection signal and selecting the operator of a current instruction without decryption for loading into the first register in response to a second state of the selection signal.

* * * * *

UNITED STATES PATENT AND TRADEMARK OFFICE
CERTIFICATE OF CORRECTION

PATENT NO. : 7,594,101 B2  
APPLICATION NO. : 11/701954  
DATED : September 22, 2009  
INVENTOR(S) : Sylvie Wuidart Page 1 of 1

It is certified that error appears in the above-identified patent and that said Letters Patent is hereby corrected as shown below:

Col. 8, line 14, should read:
A digital processing unit for executing program instructions, Signed and Sealed this Twenty-seventh Day of October, 2009

David J. Kappos
*Director of the United States Patent and Trademark Office*